May 24, 1960 W. ZORN 2,937,818

RECORDING TAPE RECEPTACLE

Filed Dec. 10, 1954

Inventor:

Werner Zorn 2,937,818

RECORDING TAPE RECEPTACLE

Werner Zorn, Berlin-Zehlendorf, Germany, assignor to Loewe Opta, Aktiengesellschaft, Berlin-Steglitz, Germany Filed Dec. 10, 1954, Ser. No. 474,555

Claims priority, application Germany Dec. 11, 1953

3 Claims. (Cl. 242—55.13)

It is well known that spools for winding and unwinding recording tapes when making sound recordings or reproduction are to be kept in receptacles (containers) which are, as a whole, put on the sound recording equipment when this is put into operation so that the tape need not be fastened by the hand when laying it on the drive-roll or on the magnetic recording head or heads. It is also already known that such containers are to be provided with observation windows which carry measurement division, e.g. in the form of strokes, with the help of which the length of the tape still present on one of the two spools can be read. Generally these measured divisions are graduated in minutes according to the unwinding of the tape, pre-supposing this to be of normal speed.

These above-mentioned arrangements of this kind have the disadvantage that they do not exactly operate without parallax. This disadvantage is overcome by means of the innovation here submitted.

According to this invention, there is provided, apart from the observation window with measured divisions in the upper part of the container, similar measured divisions on the base of the tape spool. These measured divisions on the spool base correspond in their radial distances to the measured divisions of the observation window and is, in other respects, so arranged that the strokes or marks corresponding to each other lie exactly above each other, vertical to the plane of the spool. The user is then compelled to undertake the observation always exactly in this direction, lying vertical to the plane of the spool and without parallax effect. The measured divisions on the base of the spool are preferably made in the form of concentric circles, the radial distances of which correspond to the position of the appertaining strokes in the observation window. In order to make this correspondence of the strokes in the observation window and on the spool base completely clear, it is recommended that the single strokes on both places are provided with differing colors or are made to correspond in a similar way.

The drawing shows an embodiment of the invention. It shows each embodiment at a scale of about 1:2.

Figure 1:
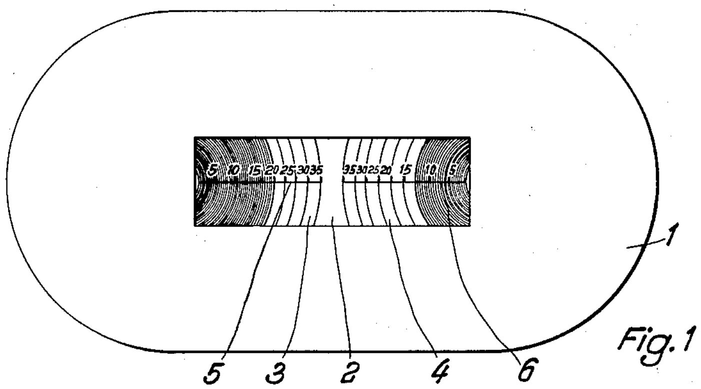
Fig. 1 is a view of a recording tape container seen from above.
Figure 2:
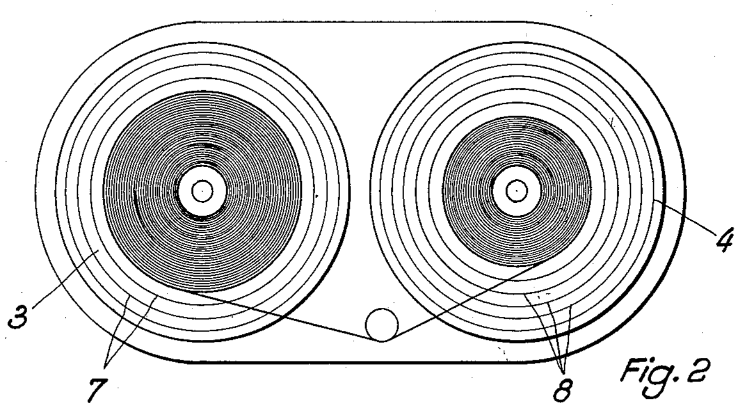
Fig. 2 is a similar view showing the tape spools with the top of the container removed, Fig. 3 a lateral section through the container.
Figure 3:
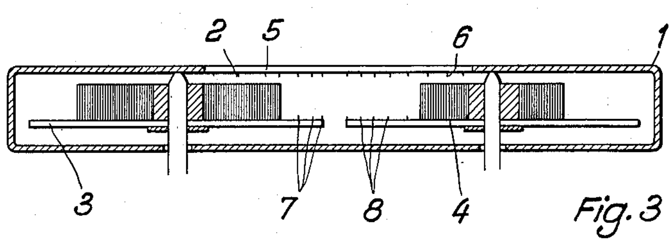

In the figures, the container, namely a substantially flat tape magazine having opposite side walls, preferably of oval form is designated by 1 and has preferably a transparent observation window 2, made in the upper part forming the cover, namely one of the side walls of the magazine. This window is best formed long enough to reach from about the middle point of one spool to the middle point of the other spool. Through the window 2, the bases, or flanges, 3 and 4 of the two tape spools, or reels, can be seen. The observation window 2 carries two graduated measured divisions, or main indicating marking means, 5 and 6, preferably graduated according to the running time of the recording tape and, from these scales, the winding length of the two reels can be found out. In the same scale and the same distances, concentric circles, or additional indicating marking means, 7 and 8 are now provided, in accordance with the invention, on the bases or flanges 3 and 4, which, in so far as they are not covered by the wound up recording tape, make possible a reading, free from parallax effect, in connection with the measured divisions 5 and 6 of the observation window 2. Each tape reel is mounted on the tape magazine turnably about an axis extending perpendicular to the opposite side walls of the magazine. The flange forms part of each tape reel, located on the side of the reel adjacent the other side wall of the tape magazine and spaced at least by the width of a tape from the transparent window. The additional indicating marking means on each flange is arranged to be visible through the window 2 and corresponds in arrangement to the main indicating marking means so that corresponding indicating marks of the main indicating marking means and the additional indicating marking means are equally spaced from the axis of the reel.

In order to co-ordinate the measured divisions in the observation window and on the spool bases clearly to one another, it is recommended that the numeration, given on window 2, are brought on to the circles of the spool bases. However, this is not altogether satisfactory since, during the running of the spools, these numbers on the spool bases cannot be perceived. It is thus more advantageous to make the single strokes of the measured divisions 5 and 6 and 7 and 8, respectively for example, of varying colours or to carry out a similar process of varying these from each other, so that the user can always exactly perceive which strokes of the measured divisions belong to each other.

A further variation of the invention lies in providing two varying measured divisions on the observation window and on the spool bases respectively, of which one is, for example, graduated in units of length (meters), the other in units of time (minutes). Also these divisions can, if occasion arises, be so produced that the division in the window is given the same color as its corresponding division on the container base or provided with the same width of stroke or similar method while the other corresponding divisions are given other colors, widths or similar indicia.

In order to make it possible to see the spool base, it is necessary to use such spools by which, at least, the top flange is transparent or open-worked or completely eliminated. Also the observation window can be spread over the whole surface of the container.

What I claim is:

1. For use in a tape recording apparatus, in combination, a substantially flat tape magazine having opposite side walls; a transparent window in one of said side walls; main indicating marking means in the region of said transparent window; a tape reel mounted in said substantially flat tape magazine turnably about an axis extending perpendicular to said opposite side walls; a flange forming part of said tape reel located on the side of the reel adjacent the other side wall of said flat tape magazine and spaced at least by the width of a tape from said transparent window; additional indicating marking means on said flange arranged to be visible through said transparent window in said one of said side walls and corresponding in arrangement to said main indicating marking means so that corresponding indicating marks of said main indicating marking means and said additional indicating marking means are equally spaced from the axis of said reel whereby when corresponding markings of said main indicating marking means and said additional indicating marking means are observed through said transparent window, parallactic errors due to inclined observation will be avoided.

2. For use in a tape recording apparatus, in combination, a substantially flat tape magazine having opposite side walls; a transparent window in one of said side walls; main indicating marking means on said transparent window; a tape reel mounted in said substantially flat tape magazine turnably about an axis extending perpendicular to said opposite side walls; a flange forming part of said tape reel located on the side of the reel adjacent the other side wall of said flat tape magazine and spaced at least by the width of a tape from said transparent window; additional indicating marking means on said flange arranged to be visible through said transparent window in said one of said side walls and corresponding in arrangement to said main indicating marking means so that corresponding indicating marks of said main indicating marking means and said additional indicating marking means are equally spaced from the axis of said reel whereby when corresponding markings of said main indicating marking means and said additional indicating marking means are observed through said transparent window, parallactic errors due to inclined observation will be avoided.

3. For use in a tape recording apparatus, in combination, a substantially flat tape magazine having opposite side walls; a transparent window in one of said side walls; main indicating marking means on said transparent window; a tape reel mounted in said substantially flat tape magazine turnably about an axis extending perpendicular to said opposite side walls; a flange forming part of said tape reel located on the side of the reel adjacent the other side wall of said flat tape magazine and spaced at least by the width of a tape from said transparent window, said flange having an inside face facing said transparent window; additional indicating marking means on the inside face of said flange arranged to be visible through said transparent window in said one of said side walls and corresponding in arrangement to said main indicating marking means so that corresponding indicating marks of said main indicating marking means and said additional indicating marking means are equally spaced from the axis of said reel, whereby when corresponding markings of said main indicating marking means and said additional indicating marking means are observed through said transparent window, parallactic errors due to inclined observation will be avoided.

References Cited in the file of this patent

UNITED STATES PATENTS

| | | |
|---|---|---|
| 2,271,326 | Bird | Jan. 27, 1942 |
| 2,418,992 | Simmon | Apr. 15, 1947 |
| 2,476,928 | Thomas | July 19, 1949 |
| 2,484,552 | Camras | Oct. 11, 1949 |

FOREIGN PATENTS

| | | |
|---|---|---|
| 342,757 | Great Britain | Feb. 5, 1931 |
| 886,490 | France | July 5, 1943 |